3,155,494
PROCESS FOR RECOVERY OF FINE ALUMINUM
FROM ALUMINUM DROSS
Sidney M. Heins, Chicago, Ill., assignor to Chemical Products Corporation, Chicago, Ill., a corporation of Illinois
No Drawing. Filed May 8, 1962, Ser. No. 193,294
9 Claims. (Cl. 75—68)

This invention concerns improvements in procedures for the recovery of metallic aluminum from aluminum dross and particularly to an improved method for the recovery of metallic aluminum from the dross which results during processes wherein molten aluminum is employed.

Heretofore the recovery of metallic aluminum from dross and aluminum oxides has been a relatively long and costly process which often is economically not practical with the result that the dross is simply dumped as waste. Furthermore the usual smelting procedures for conversion of dross require special preparation steps and at best are relatively inefficient in the amount of fine metal recovered.

Therefore the main objects of this invention are to provide an improved method of converting aluminum dross to the metallic state whereby the metal can be readily recovered in a rapid and economical manner; to provide such a method that can be performed with conventional foundry equipment and at a relatively low cost; and to provide such a method whereby the entire aluminum recovery procedure can be accomplished in a fraction of the time required for ordinary aluminum recovery methods.

Basically my improved method involves the melting of aluminum dross fines by means of a controlled exothermic reaction, in a suitable crucible or furnace, then removing the metal from the crucible or furnace and crushing the metal particles into a fine powder, and finally removing any materials remaining from the melting process by air separation or burning.

In the preferred practice of my invention I first crush the aluminum dross to a fineness of about twenty mesh and then thoroughly mix the crushed dross with an alkali nitrate, such as sodium nitrate or potassium nitrate, in the proportion of approximately four parts by weight of dross to one part by weight of the nitrate. This mixture is then heated in a suitable vessel to a low temperature of about 650° F., sufficient to fuse the nitrate, and when the nitrate has fused and become liquid, charcoal crushed to about twenty mesh is added to create an exothermic reaction with the nitrate and to thereby raise the temperature of the mixture to about 1200° F. or just sufficient to melt the aluminum. When the temperature of the mixture resulting from the reaction reaches the point where the material becomes a mushy mass the material is stirred, or otherwise agitated, to cause the metal particles melted from the dross to coalesce. The metal is then removed from the melting vessel and is crushed to a fine powder or about fifty mesh after which any remaining charcoal is removed by burning or by air separation.

The actual amount of alkali nitrate employed in the initial mixture with the crushed dross may vary from fifteen percent to twenty percent by weight of the mixture, the upper limit being such as to contain the exothermic reaction caused by the addition of charcoal so that the mass will reach a temperature within the range of 1100° F. to 1250° F. or just sufficient to cause the mass to be of a mushy state. The purpose of this is to avoid oxidation of the aluminum and yet permit efficient utilization of the alkali nitrate in the heat producing reaction. The quantity of charcoal employed will amount to about five to six percent by weight of the mixture of the alkali nitrate and dross, and it will be understood that, since the charcoal reacting with the nitrate produces the heat for melting the metal, the rate at which the charcoal is added to the preheated mixture will control the reaction and hence the ultimate temperature that may be reached. Also, particularly when the alkali nitrate used is sodium nitrate, the addition of a small amount of lime, i.e. from two to five percent by weight of the dross and nitrate mixture, will prevent the reaction from becoming too rapid and violent when the charcoal is added.

The charcoal, however, appears to also contain the oxidizing action on the melted aluminum that would ordinarily be thought to occur as a result of the reaction with the nitrate and when the mushy-state mixture is stirred the molten particles of metal tend to coalesce into globules of substantially pure aluminum contaminated only by any excess of charcoal that may remain when the reaction with the nitrate has become spent. As before mentioned, such charcoal may be removed by crushing the metal pieces to a fine powder, of about fifty mesh, and then subjecting the powder to a burning or air separation process in the well known manner.

The main advantages of this invention reside in the fact that it can be practiced without the need for special procedural steps and by means of ordinary foundry equipment; in the fact that the cost of the improved recovery process is considerably less than procedures heretofore employed; and in the fact that by the improved process the fine metal can be recovered at a greater rate and in less time than by prior procedures.

Although but one embodiment of my invention has been herein described it will be understood that modifications may be made without departing from the spirit of the invention as defined by the following claims.

I claim:

1. The method of recovering metallic aluminum from aluminum dross which consists in preparing a mixture of four parts by weight of crushed aluminum dross and about one part by weight of an alkali nitrate selected from the group consisting of sodium nitrate and potassium nitrate, heating the mixture until the nitrate becomes fused, adding crushed charcoal to the heated mixture at a rate to produce heat by the exothermic reaction of the charcoal and the fused nitrate sufficient to melt the aluminum, and then coalescing the melted aluminum by agitation.

2. The process defined by claim 1 wherein the alkali nitrate is sodium nitrate.

3. The process defined by claim 1 wherein the alkali nitrate is potassium nitrate.

4. The method defined by claim 1 wherein the amount of alkali nitrate mixed with the crushed dross is not greater than that which when fused and then exothermically reacted with the charcoal will produce a mixture temperature of about 1100° F. to 1250° F.

5. The method defined by claim 1 wherein the amount of alkali nitrate mixed with the crushed dross is from 15 to 20 percent of the mixture by weight.

6. The method of recovering metallic aluminum from aluminum dross which comprises the steps of mixing an alkali nitrate selected from the group consisting of sodium nitrate and potassium nitrate with crushed dross in the proportions of about one part by weight of said nitrate to four parts by weight of dross, heating the said mixture until the nitrate becomes fused, then adding crushed charcoal to the heated mixture at a rate to produce heat by the exothermic reaction of the nitrate and charcoal sufficient to raise the temperature of the mixture so as to melt the aluminum, and then stirring the mixture to coalesce the melted aluminum, allowing the aluminum to solidify, crushing the aluminum to a fine powder, and then removing any remaining charcoal from the powdered metal.

7. The process defined by claim 6 wherein the exothermic reaction is controlled by the rate of addition of the charcoal to rise the temperature of the mixture to at least 1100° F. but not greater than about 1250° F.

8. The process defined by claim 6 wherein the alkali nitrate is sodium nitrate, and wherein 2 to 5% by weight of lime is added to the mixture prior to the addition of the charcoal.

9. The method of recovering metallic aluminum from aluminum dross which consists in preparing a mixture of four parts by weight of crushed aluminum dross and about one part by weight of an alkali nitrate selected from the group consisting of sodium nitrate and potassium nitrate, wherein the amount of the nitrate is from fifteen to twenty percent of the mixture by weight, heating the mixture until the nitrate becomes fused, adding crushed charcoal to the heated mixture at a rate to produce heat by the exothermic reaction of the charcoal and the fused nitrate sufficient to raise the temperature of the mixture to at least 1100° F. but not greater than 1250° F., and then coalescing the melted aluminum by agitation.

References Cited by the Examiner
UNITED STATES PATENTS

| | | | |
|---|---|---|---|
| 1,257,995 | 3/18 | Giulini | 75—68 |
| 2,073,018 | 3/37 | Lepp | 75—68 |
| 2,481,591 | 9/49 | Heilman | 75—68 |
| 2,754,199 | 7/56 | Stroup | 75—68 |
| 2,999,747 | 9/61 | Ronzio | 75—27 |

BENJAMIN JENKIN, *Primary Examiner.*

WINSTON A. DOUGLAS, *Examiner.*